United States Patent
Handa et al.

(10) Patent No.: US 7,023,783 B2
(45) Date of Patent: Apr. 4, 2006

(54) METHOD OF CONTROLLING DATA WRITING VELOCITY AND OPTICAL DISK PLAYER

(75) Inventors: Yuji Handa, Nagano (JP); Takashi Harada, Nagano (JP)

(73) Assignee: Shinano Kenshi Kabushiki Kaisha, Nagano (JP)

( * ) Notice: Subject to any disclaimer, the term of this patent is extended or adjusted under 35 U.S.C. 154(b) by 612 days.

(21) Appl. No.: 10/281,308

(22) Filed: Oct. 28, 2002

(65) Prior Publication Data

US 2003/0090972 A1 May 15, 2003

(30) Foreign Application Priority Data

Nov. 9, 2001 (JP) .............................. 2001-344741

(51) Int. Cl.
*G11B 7/0045* (2006.01)

(52) U.S. Cl. ............................... 369/53.57; 369/44.27; 369/124.14

(58) Field of Classification Search ..................... None
See application file for complete search history.

(56) References Cited

U.S. PATENT DOCUMENTS

| 6,430,125 | B1 * | 8/2002 | Alon et al. ............... 369/44.32 |
| 6,856,583 | B1 * | 2/2005 | Harada ..................... 369/30.23 |
| 2002/0191506 | A1 * | 12/2002 | Okamoto et al. .......... 369/47.4 |

* cited by examiner

*Primary Examiner*—Brian E. Miller
*Assistant Examiner*—Michael V. Battaglia
(74) *Attorney, Agent, or Firm*—Birch, Stewart, Kolasch & Birch, LLP (57) ABSTRACT

The method of controlling data writing velocity of an optical disk player is capable of correctly writing data on a nonstandard optical disk as well as a standard optical disk.

The method comprises the steps of: analyzing a track pitch of an optical disk on the basis of a moving distance of an optical pick-up in a prescribed time and the address thereof when a data writing test is executed in an innermost area of the optical disk; judging if the optical disk is a standard optical disk having a standard track pitch or not; calculating an address of changing data writing velocity on the basis of the analyzed track pitch if the optical disk is a nonstandard optical disk; and changing the data writing velocity when the address to which the optical pick-up irradiates the laser beam reaches the calculated address.

4 Claims, 8 Drawing Sheets

PRIOR ART

METHOD OF CONTROLLING DATA WRITING VELOCITY AND OPTICAL DISK PLAYER

BACKGROUND OF THE INVENTION

The present invention relates to a method of controlling data writing velocity of an optical disk player and an optical disk player employing said method.

Optical disk players have been used so as to write data on optical disks, e.g., CD-R (Compact Disk-Recordable), CD-RW (Compact Disk-ReWritable).

Rotational speed of an optical disk while writing data is controlled on the basis of writing velocity, e.g., linear velocity, angular velocity.

In a conventional optical disk player, for example, the revolution number of an optical disk is controlled to maintain linear velocity for writing data on an optical disk. By maintaining the linear velocity, the data can be written with fixed pit density. This writing manner is called a CLV (Constant Linear Velocity) manner. In the CLV manner, the linear velocity is maintained, so the revolution number of the optical disk is gradually reduced while data are written toward an outer part of the disk.

To accelerate the data writing velocity by the CLV manner, the revolution number of the optical disk is merely increased, so that the revolution number is too great to write data in the inner part of the optical disk. Further, a spindle motor, which rotates the optical disk, is over-loaded. Thus, data cannot be securely written in the inner part of the optical disk, and reliability of data must be lower.

This problem of the CLV manner was solved by a zone CLV manner, in which data can be written in the inner part of the optical disk without extremely increasing the revolution number of the optical disk and total writing time can be shortened.

In the zone CLV manner, a data writing area of the optical disk is divided into a plurality of zones, and the CLV manner is applied to each zone. Firstly, the linear velocity for writing data in the innermost zone of the disk without applying overload to the spindle motor is determined. Then, the linear velocity for other zones are determined. The linear velocity for writing data is accelerated, by stages, toward the outermost zone of the optical disk. The linear velocity of the zones can be determined on the basis of rotational speed of the spindle motor for writing data in the innermost zone as a standard speed, so reliability of data written in the innermost zone can be improved.

A conventional method of controlling data writing velocity by the zone CLV manner will be explained with reference to FIGS. 6 and 7.

Figure 6:
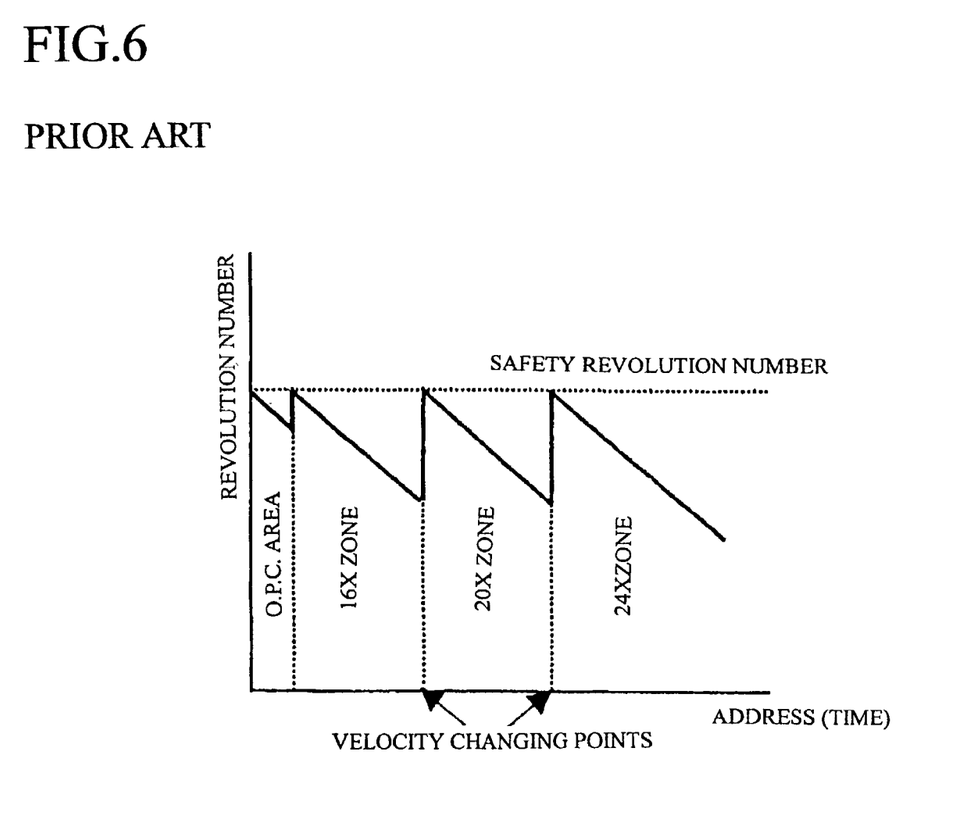
FIG. 6 is a graph showing a relationship, between a revolution number of a spindle motor and address of writing data, of the conventional zone CLV manner.
Figure 7:
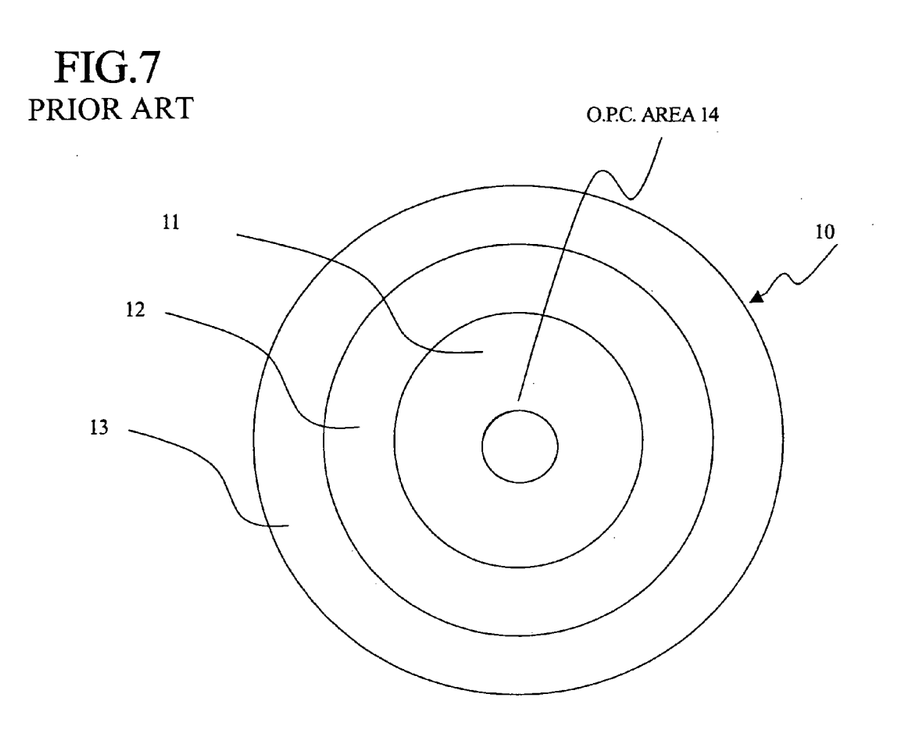
FIG. 7 is an explanation view of an optical disk whose data writing area is divided into a plurality of zones for the zone CLV manner.

In a graph of FIG. 6, the horizontal axis is address or time of writing data; the vertical axis is the revolution number of the spindle motor.

A controller of the optical disk player reads address data from a wobble groove, which has been previously grooved in the optical disk 10. The optical disk player employing the zone CLV manner uses an innermost area of the optical disk 10 as an optimum power control (OPC) area 14, in which data writing test is executed. By the data writing test in the OPC area 14, optimum laser power for writing data on the optical disk 10 is determined.

Since the OPC area 14 is the innermost area of the optical disk 10, a revolution number of the spindle motor for the data writing test in the OPC area 14 may be regarded as a revolution number for correctly writing data. Therefore, we call that revolution number the safety revolution number.

The controller of the optical disk player controls data writing velocity in zones 11, 12 and 13 of the optical disk 10 respectively. The data writing area has been previously divided into the zones by a firmware. The data writing velocity is accelerated, by stages, toward the outermost zone 13 of the optical disk 10.

Figure 8:
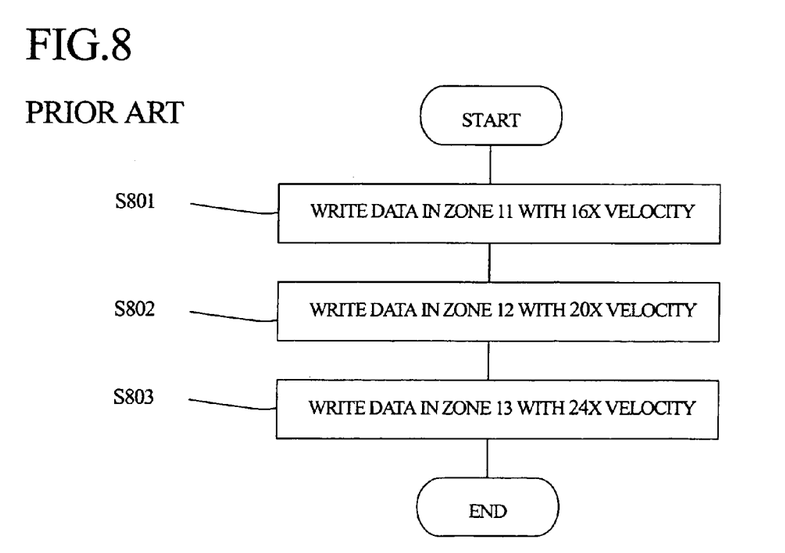
FIG. 8 is a flow chart of the conventional method.

An example of a control flow chart of the zone CLV manner is shown in FIG. 8. In the conventional zone CLV manner, firstly the data writing test is executed in the innermost OPC area 14 with 16× writing velocity. Then, an analyzer determines optimum laser power for writing data on the optical disk 10.

After the optimum laser power is determined, the controller writes data in the zone 11 of the data writing area of the optical disk 10 with 16× velocity (Step S801). Then, data are written in the zone 12 with 20× velocity (Step S802) and in the zone 13 with 24× velocity (Step S803). Namely, the data writing velocity is accelerated, by stages, toward an outer edge of the optical disk 10.

By employing the zone CLV manner, the revolution number of the spindle motor for writing data in the innermost zone 11 without applying overload can be determined. Therefore, reliability of data written in the innermost zone 11 can be improved, and total time for writing data can be shortened.

These days, industrial standards of optical disks have been settled. Therefore, standard disks are mainly supplied. However, nonstandard disks, which have greater recording density and capacity, are also required.

Figure 9:
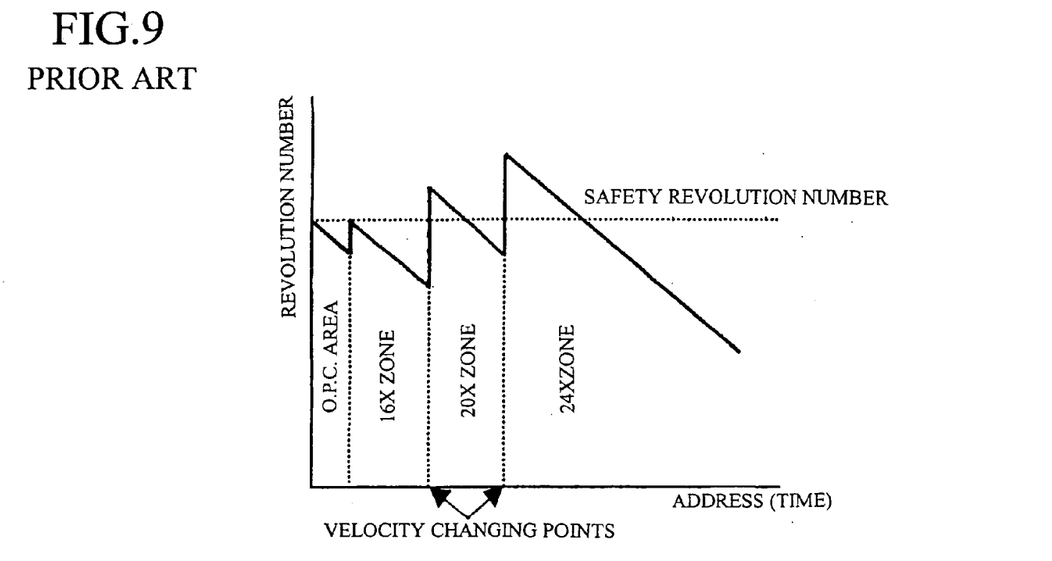
FIG. 9 is a graph showing a relationship, between a revolution number of a spindle motor and address of writing data, of a nonstandard disk having a narrow track pitch.

Velocity changing points of the standard disk, at which the data writing velocity is changed, have been previously written in the firmware of the optical disk player. For example, in the case of a nonstandard optical disk having narrow track pitch or greater recording capacity, optimum velocity changing points are shifted inward with respect to those of the standard disk. If the data writing velocity is accelerated at the velocity changing points of the standard disk, there is a case that the revolution number of the spindle motor is made greater than the safety revolution number, so that reliability of written data is made lower (see FIG. 9). Note that, FIG. 9 is a graph showing a relationship between the revolution number of the spindle motor and address or time of writing data in the nonstandard disk having the narrow pitch.

Figure 10:
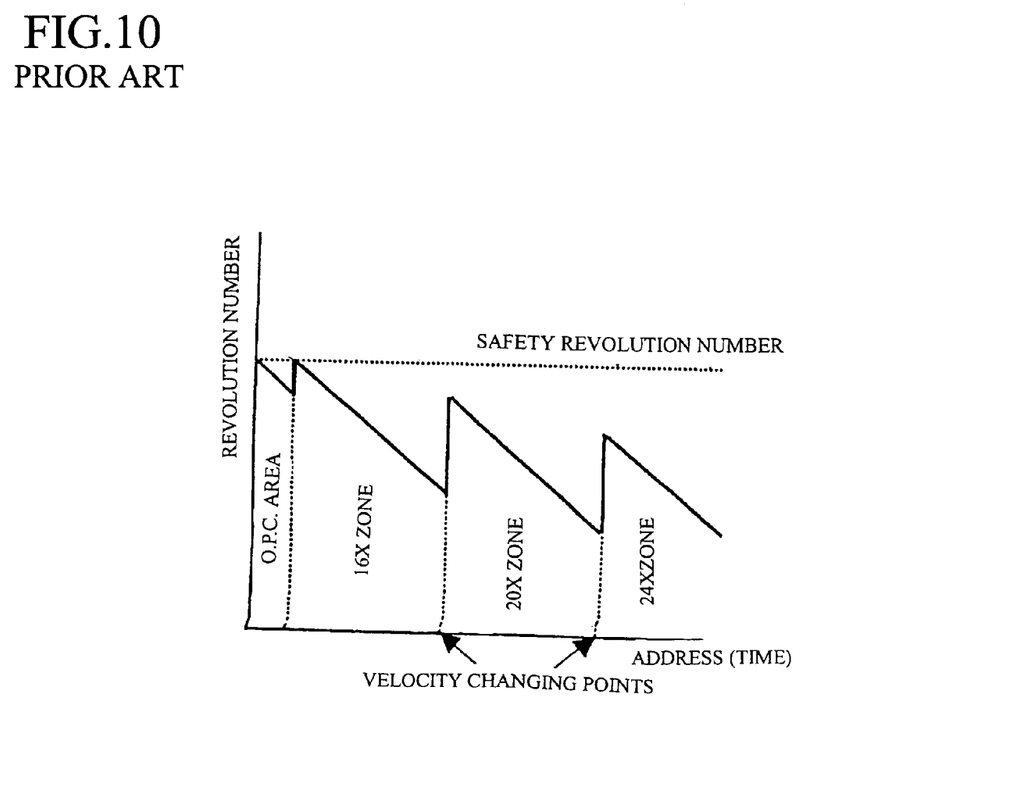
FIG. 10 is a graph showing a relationship, between a revolution number of a spindle motor and address of writing data, of a nonstandard disk having a wide track pitch.

On the other hand, in the case of a nonstandard optical disk having wide track pitch or smaller recording capacity, optimum velocity changing points are shifted outward with respect to those of the standard disk. Even if the data writing velocity is accelerated at the velocity changing points of the standard disk, the revolution number of the spindle motor is always smaller than the safety revolution number. Namely, the optical disk player cannot give full data writing function, and time for writing data must be longer (see FIG. 10). Note that, FIG. 10 is a graph showing a relationship between the revolution number of the spindle motor and address or time of writing data in the nonstandard disk having the wide pitch.

SUMMARY OF THE INVENTION

An object of the present invention is to provide a method of controlling data writing velocity of an optical disk player, which is capable of correctly writing data on a nonstandard optical disk as well as a standard optical disk.

Another object is to provide an optical disk player employing the method.

The method of controlling data writing velocity of an optical disk player comprises the steps of:

analyzing a track pitch of an optical disk on the basis of a moving distance of an optical pick-up in a prescribed time and the address thereof when a data writing test is executed in an innermost area of the optical disk;

judging if the optical disk is a standard optical disk having a standard track pitch or not;

calculating an address of changing data writing velocity on the basis of the analyzed track pitch if the optical disk is a nonstandard optical disk; and changing the data writing velocity when the address to which the optical pick-up irradiates the laser beam reaches the calculated address.

In the optical disk player employing the method, the data writing area is divided into a plurality of zones according to a design of the optical disk and properly changes the data writing velocity at the calculated address. Therefore, time for writing data can be shortened, and reliability of written data can be improved.

In the method, the address at which the data writing velocity is changed may be calculated on the basis of a revolution number of a spindle motor for executing the data writing test in the innermost area of the optical disk.

With this method, load applying to the spindle motor while writing data can be made smaller than that of the conventional method, in which the data writing velocity is changed on the basis of the revolution number of the spindle motor writing data in the innermost zone of the optical disk.

On the other hand, the optical disk player of the present invention comprises:

an optical pick-up irradiating a laser beam for writing data on an optical disk and receiving a reflected beam reflected from the optical disk;

means for analyzing an address of the optical disk to which the optical pick-up irradiates the laser beam on the basis of wobble signals included in the reflected beam received by the optical pick-up; and velocity control means for changing data writing velocity when the address to which the optical pick-up irradiates the laser beam reaches a prescribed address, wherein the velocity control means analyzes a track pitch of the optical disk on the basis of a moving distance of the optical pick-up in a prescribed time and the address thereof when a data writing test is executed in an innermost area of the optical disk, judges if the optical disk is a standard optical disk having a standard track pitch or not, calculates an address of changing the data writing velocity on the basis of the analyzed track pitch if the optical disk is a nonstandard optical disk, and changes the data writing velocity when the address to which the optical pick-up irradiates the laser beam reaches the calculated address.

In the optical disk player, the data writing area is divided into a plurality of zones according to a design of the optical disk and properly changes the data writing velocity at the calculated address. Therefore, time for writing data can be shortened, and reliability of written data can be improved.

In the optical disk player, the address at which the data writing velocity is changed may be calculated on the basis of a revolution number of a spindle motor for executing the data writing test in the innermost area of the optical disk. With this structure, load applying to the spindle motor while writing data can be made smaller than that of the conventional method, in which the data writing velocity is changed on the basis of the revolution number of the spindle motor writing data in the innermost zone of the optical disk.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

The optical disk player of the embodiments of the present invention employs the zone CLV manner, which has been explained with reference to FIGS. 6–8, so explanation of the zone CLV manner will be omitted.

Note that, the optical disk player, e.g., a CD-R player, a CD-RW player, includes control means for changing data writing velocity when an address to which an optical pick-up irradiates the laser beam reaches a prescribed address. The method of controlling the data writing velocity will be explained.

Figure 1:
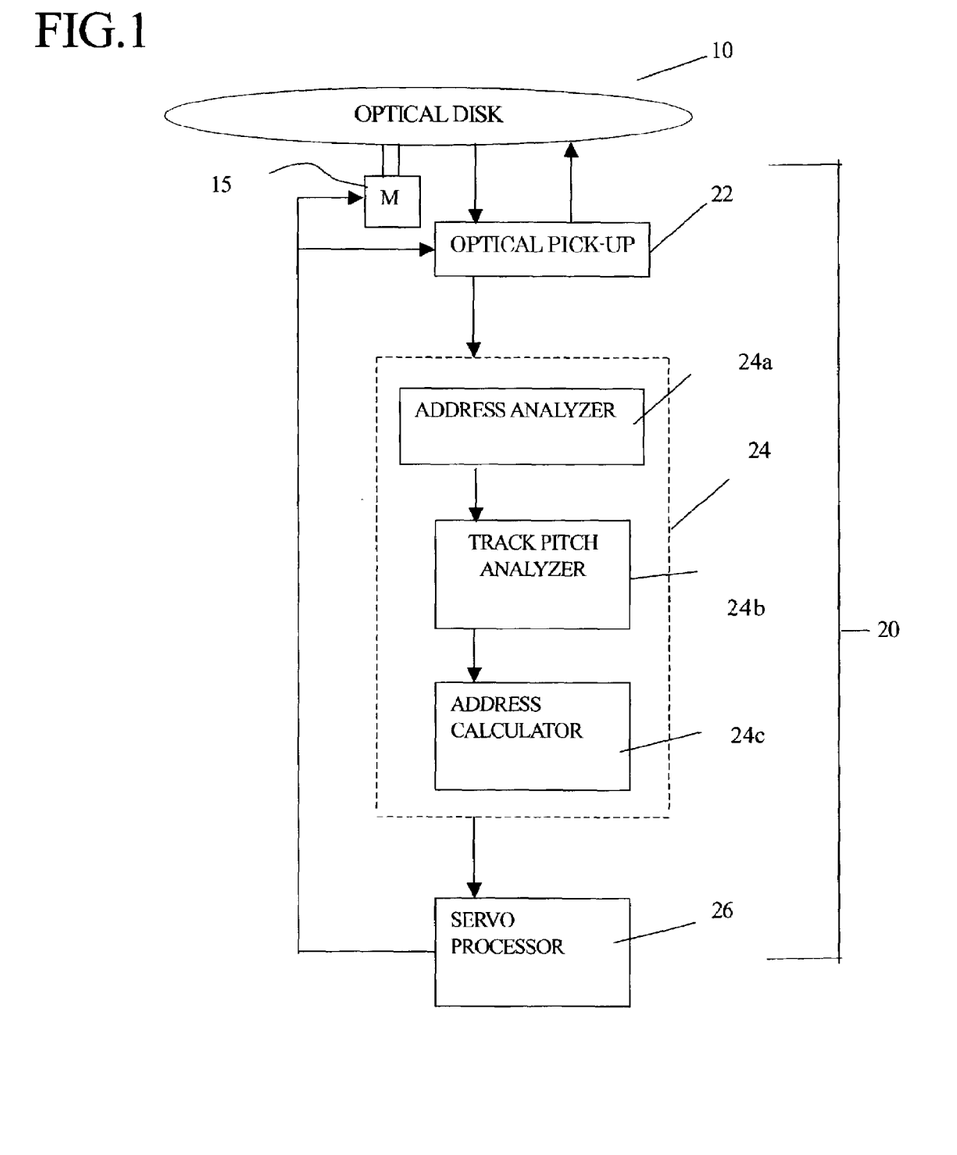
FIG. 1 is a block diagram of an optical disk player of a first embodiment of the present invention.

FIG. 1 shows a block diagram of the optical disk player 20. The optical disk player 20 has: a spindle motor 15 for rotating an optical disk 10; an optical pick-up 22 for irradiating a laser beam to the optical disk 10 and receiving a reflected beam reflected there from; a CPU 24 which acts as analyzing means; an RF amplifier (not shown); and a servo processor 26 which controls a revolution number of the optical disk 10 as velocity control means. Note that, the CPU 24 includes: an address analyzer 24a analyzing address on the basis of wobble signals read by the optical pick-up 22; a track pitch analyzer 24b; and an address calculator 24c which calculates addresses of changing the data writing velocity.

When a data writing test is executed in the OPC area 14 (see FIG. 7), the wobble signals included in the reflected beam received by the, optical pick-up 22 are analyzed by the CPU 24. The CPU 24 analyzes a track pitch of the optical disk 10 on the basis of the wobble signals and a moving distance of the optical pick-up 22 in the radial direction of the optical disk 10, then compares the analyzed track pitch with a standard track pitch so as to judge if the optical disk 10 is a standard disk or not. If the CPU 24 judges that the optical disk 10 is the standard disk, the servo processor 28 changes the data writing velocity at predetermined velocity changing points whose addresses have been defined by a firmware.

On the other hand, if the analyzed track pitch is different from the standard track pitch, the CPU 24 judges that the optical disk 10 is a nonstandard disk, then calculates optimum addresses of the optical disk 10, at which the data writing velocity is changed, on the basis of prescribed formulas:

$$\pi(r0)^2 + TP*LV*t = \pi R^2 \quad \text{(Formula 1); and}$$

$$(LV/2\pi R)*60*SP = N \quad \text{(Formula 2)}$$

In the Formula 1, "r0" is a radius of disk 10 corresponding to a starting point of the data writing area; "TP" is the track pitch of the disk 10; "LV" is linear velocity for reading data written on the disk 10; "t" is an address or time; and "R" is a radius of the disk 10 corresponding to a prescribed address.

In the Formula 2, "SP" is the data writing velocity; and "N" is a revolution number of the optical disk 10.

Namely, variable numbers based of the optical disk 10 are "r0", "TP", "t" and "R"; variable numbers based on the optical disk player 20 are "LV", "SP" and "N".

When the optical disk 10 is set in the optical disk player 20, the optical disk 10 is scanned so as to detect the variable numbers "r0" and "t". The number "t" is known from an extent or time of the OPC area. By executing the data writing test in the OPC area, the number "TP" can be known. Note that, the number "LV" may be previously fixed on the basis of design of the optical disk 10.

The data writing area is located on the outer side of the OPC area, so an address of a starting point of the data writing area is "0". Namely, the number "t" of the OPC area is a minus number.

By substituting real numbers for "r0", "t", "TP" and "LV" of the Formula 1, the radius "R" of the innermost part of the optical disk 10 can be calculated. Then, the calculated number "R" and the data writing velocity of the OPC area are substituted into the Formula 2 so as to calculate a revolution number per one minute of the optical disk for writing data in the innermost part. The calculated revolution number is the safety revolution number of the present invention.

When the addresses "t" of the velocity changing points are calculated, the addresses "t" can be calculated by the Formulas 1 and 2. Note that, in this case, the revolution number of the optical disk 10 must be less than the safety revolution number.

The CPU 24 continuously writes data with analyzing the present address, at which the optical pick-up 22 now irradiates the laser beam. When the optical pick-up 22 reaches the addresses or the velocity changing points calculated on the basis of the Formulas 1 and 2, the servo processor 26 controls the rotational speed of the spindle motor 15 so as to change the data writing velocity.

Figure 2:
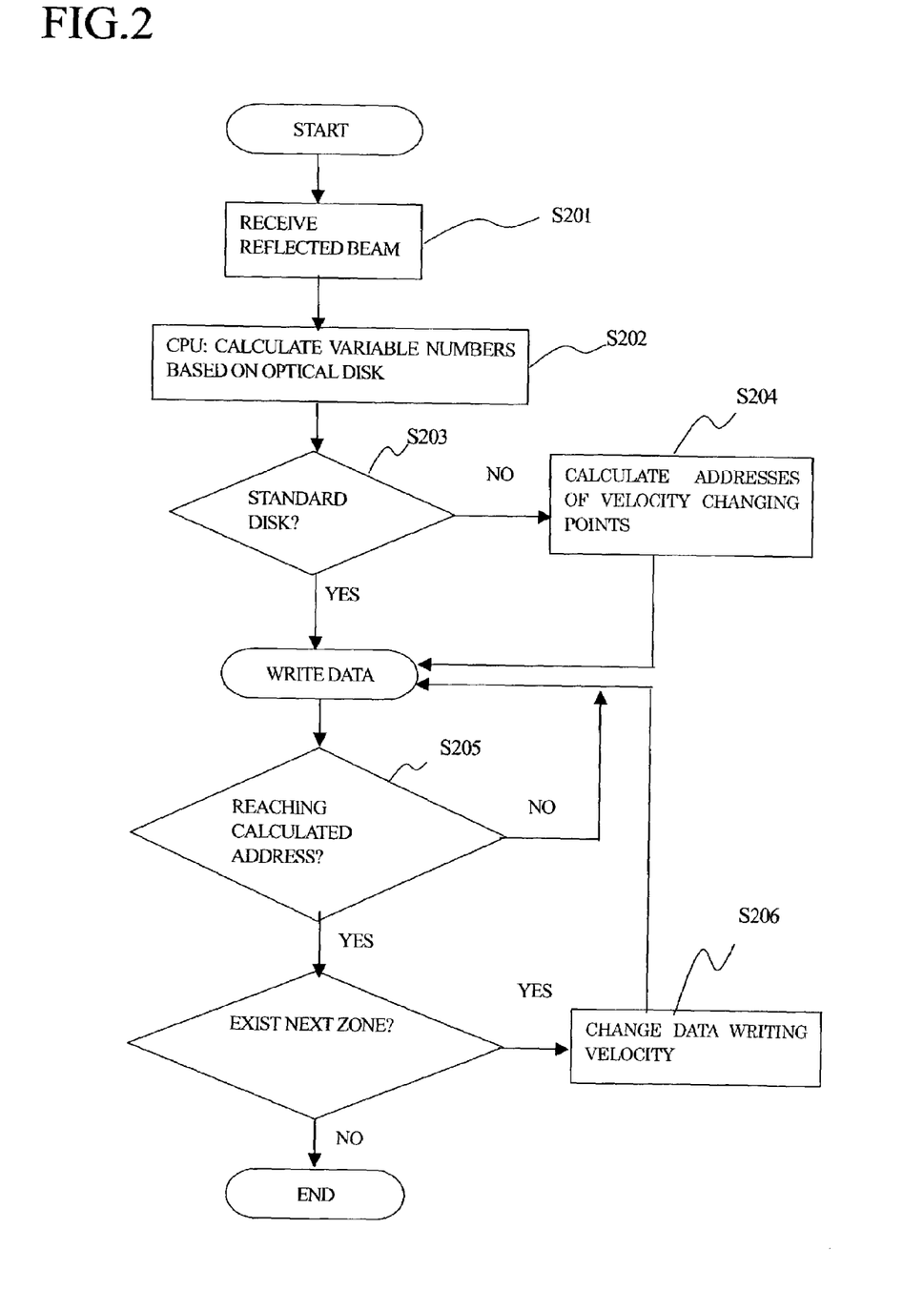
FIG. 2 is a flow chart of the method of the first embodiment.

FIG. 2 shows a flow chart of the method of a first embodiment.

The optical pick-up 22 scans the wobble groove of the optical disk 10 by irradiating the laser beam to the optical disk 10 and receiving the reflected beam reflected from the optical disk 10 (step S201). The CPU 24 calculates the variable numbers based on the optical disk 10, e.g., the track pitch, on the basis of an initial address of the optical pick-up 22, which is known from the wobble signals included in the reflected beam, the moving distance of the optical pick-up 22, which has moved in the radial direction of the optical disk 10, and the present address of the optical pick-up 22, which is known from the wobble signals (step S202). The CPU 24 judges if the optical disk 10 is a standard disk or not by comparing the calculated track pitch, etc. with those of the standard disk (step S203). If the CPU 24 judges that the optical disk 10 is the standard disk, the data writing velocity is changed at the velocity changing points, which have been determined by firmware.

On the other hand, if the CPU 24 judges that the optical disk 10 is a nonstandard disk, the CPU 24 substitutes the variable numbers based on the optical disk 10, e.g., the track pitch, and the variable numbers based on the optical disk player 20, e.g., the data writing velocity, into the Formulas 1 and 2 so as to calculate addresses of optimum velocity changing points (step S204).

The CPU 24 compares the present address with the calculated address, at which the data writing velocity is changed (step S205). If the present address reaches the calculated address, the servo processor 26 changes the revolution number of the spindle motor 15 so as to change the data writing velocity (step S206). Above described action is executed in each zone.

Figure 3:
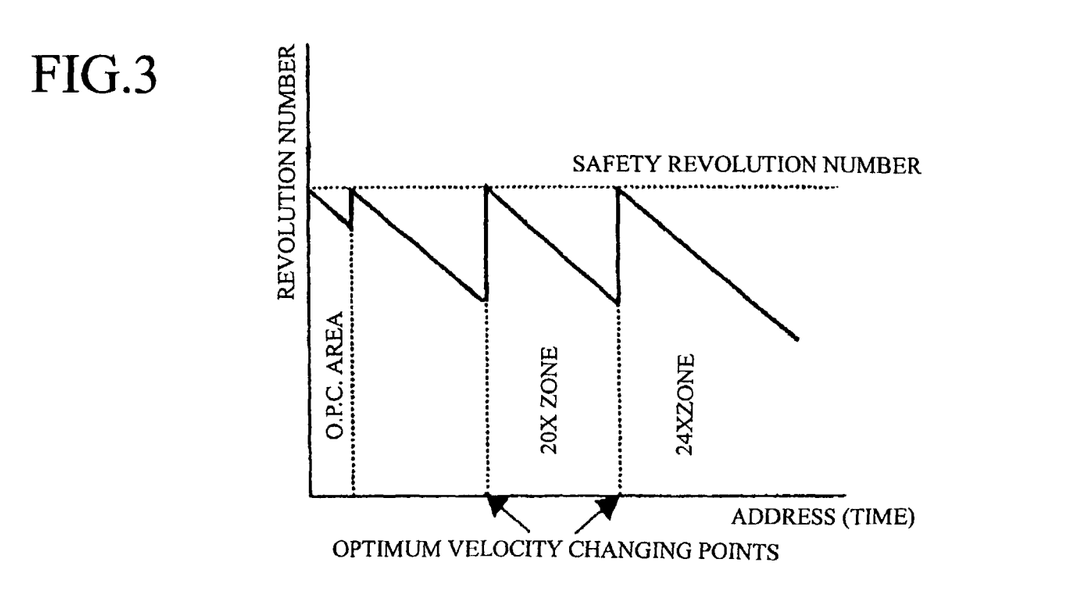
FIG. 3 is a graph showing a relationship between a revolution number of a spindle motor and address of writing data.

By employing the method of the first embodiment, as shown in FIG. 3, reliability of the written data can be improved without applying overload to the spindle motor 15 even if the optical disk 10 is the nonstandard disk. Since the optical disk player 20 can give full function of writing, so time for writing data can be shortened.

In the method of the first embodiment, the CPU 24 calculates the track pitch from the wobble data read by the optical pick-up 22, the moving distance of the optical pick-up 22. Then, the CPU 24 substitutes the variable numbers based on the optical disk 10 and the optical disk player 20 into the Formulas 1 and 2 so as to calculate the addresses of the optimum velocity changing points. The present invention is not limited to the first embodiment.

Figure 4:
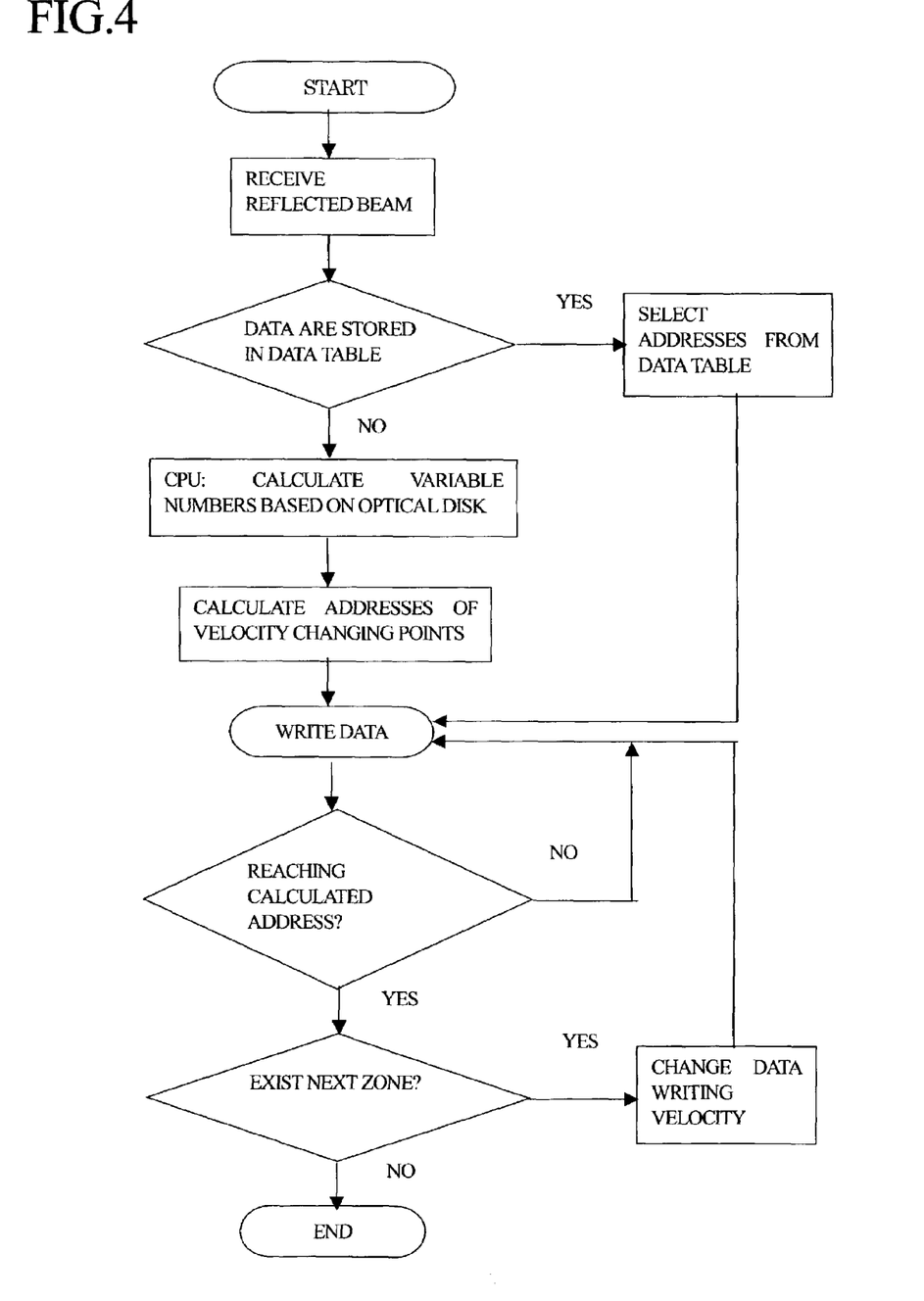
FIG. 4 is a flow chart of the method of a second embodiment.

The method of a second embodiment is shown in FIG. 4. The variable numbers based on the standard optical disk and the optical disk player have been previously stored in a data table or tables. If the variable numbers of the optical disk are not stored in the data table or tables, the CPU 24 judges that the optical disk is a nonstandard disk, and the addresses of the optimum velocity changing points are calculated.

Figure 5:
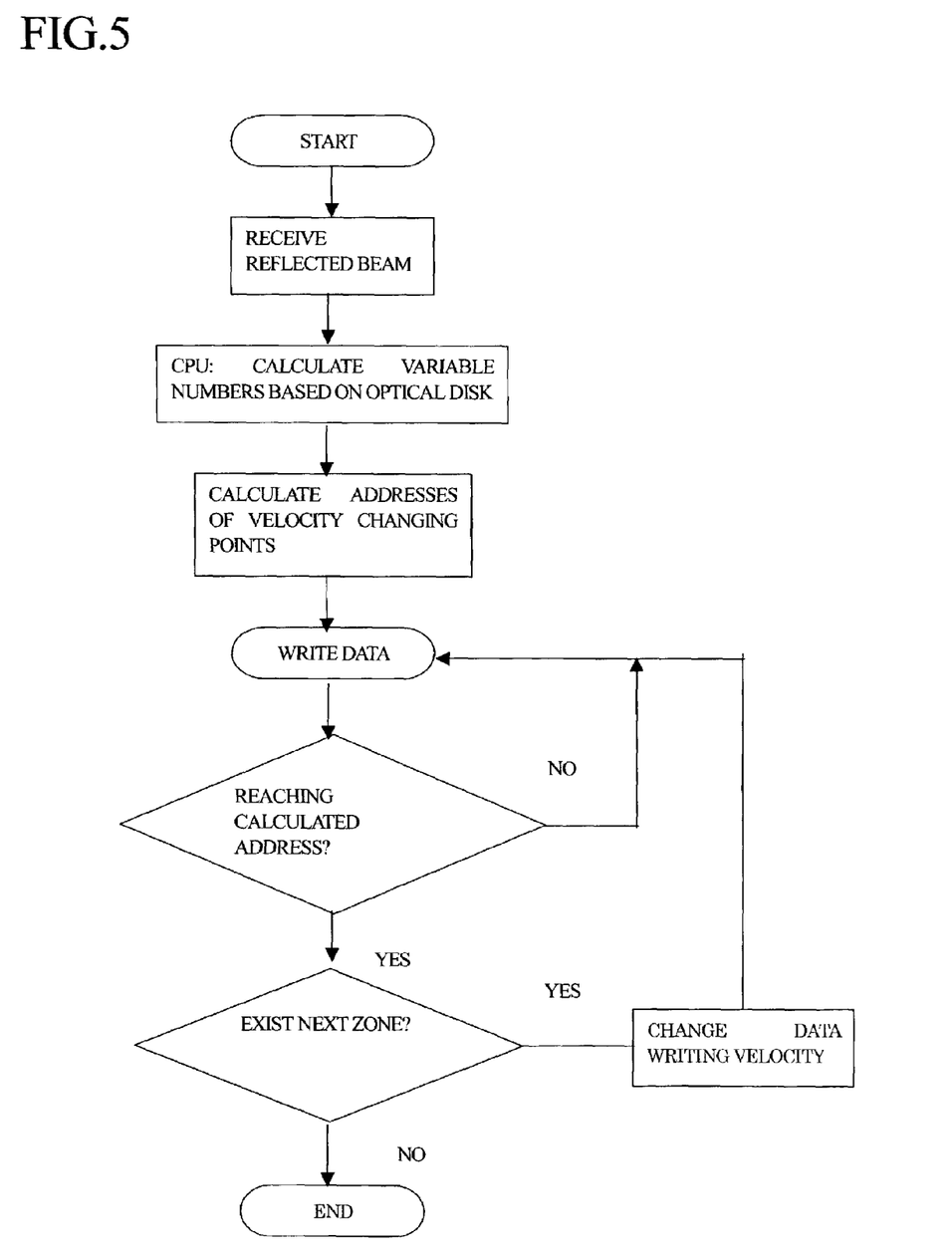
FIG. 5 is a flow chart of the method of a third embodiment.

The method of a third embodiment is shown in FIG. 5. After the CPU 24 analyzes the track pitch of the optical disk, the addresses of the optimum velocity changing points are always calculated without reference to the standard disk or the nonstandard disk.

In the above described embodiments, the data writing velocity is changed by three stages: 16× velocity, 20× velocity and 24× velocity. Therefore, there are two velocity changing points in the optical disk, but number of the velocity changing points may be one or three or more.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling data writing velocity of an optical disk player, comprising the steps of:

analyzing a track pitch of an optical disk on the basis of a moving distance of an optical pick-up in a prescribed time and the address thereof when a data writing test is executed in an innermost area of the optical disk;

judging if the optical disk is a standard optical disk having a standard track pitch or not;

calculating an address of changing data writing velocity on the basis of the analyzed track pitch if the optical disk is a nonstandard optical disk; and changing the data writing velocity when the address to which said optical pick-up irradiates the laser beam reaches the calculated address.

2. The method according to claim 1, wherein the address at which the data writing velocity is changed is calculated on the basis of a revolution number of a spindle motor for executing the data writing test in the innermost area of the optical disk.

3. An optical disk player, comprising:

an optical pick-up irradiating a laser beam for writing data on an optical disk and receiving a reflected beam reflected from the optical disk;

means for analyzing an address of the optical disk to which said optical pick-up irradiates the laser beam on the basis of wobble signals included in the reflected beam received by said optical pick-up; and velocity control means for changing data writing velocity when the address to which said optical pick-up irradiates the laser beam reaches a prescribed address, wherein said velocity control means analyzes a track pitch of the optical disk on the basis of a moving distance of said optical pick-up in a prescribed time and the address thereof when a data writing test is executed in an innermost area of the optical disk, judges if the optical disk is a standard optical disk having a standard track pitch or not, calculates an address of changing the data writing velocity on the basis of the analyzed track pitch if the optical disk is a nonstandard optical disk, and changes the data writing velocity when the address to which said optical pick-up irradiates the laser beam reaches the calculated address.

4. The optical disk player according to claim 3, wherein the address at which the data writing velocity is changed is calculated on the basis of a revolution number of a spindle motor for executing the data writing test in the innermost area of the optical disk.

* * * * *